J. J. BYERS.
BRAKE BEAM FULCRUM.
APPLICATION FILED SEPT. 23, 1913.
1,098,425.
Patented June 2, 1914.
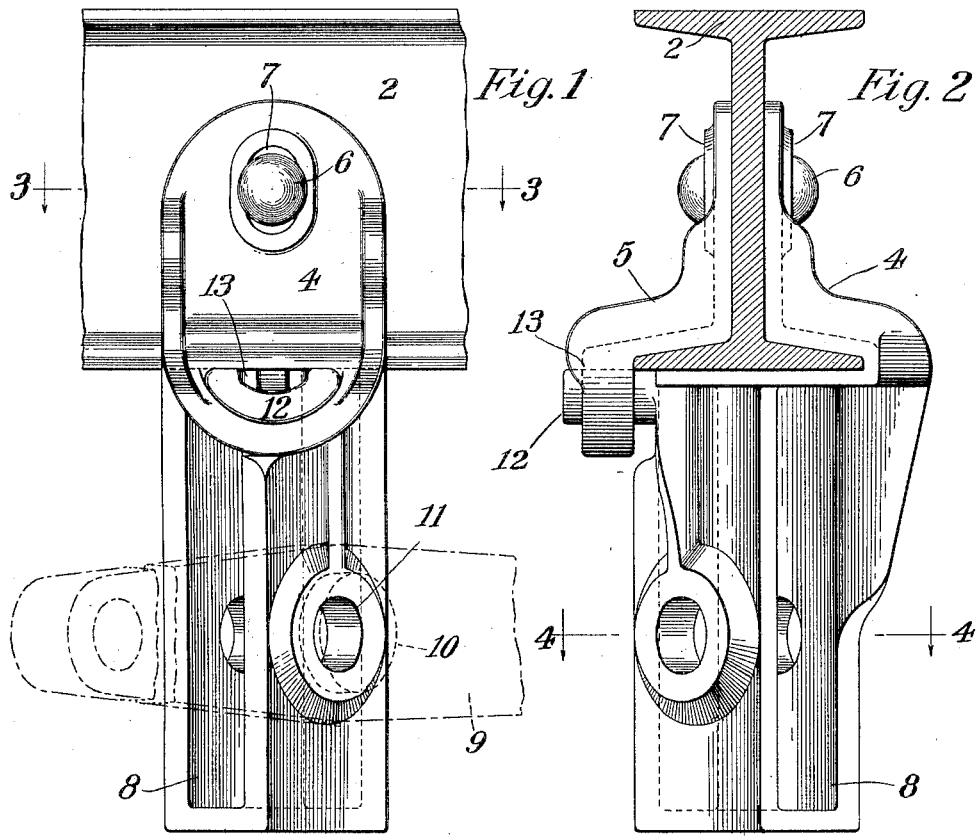
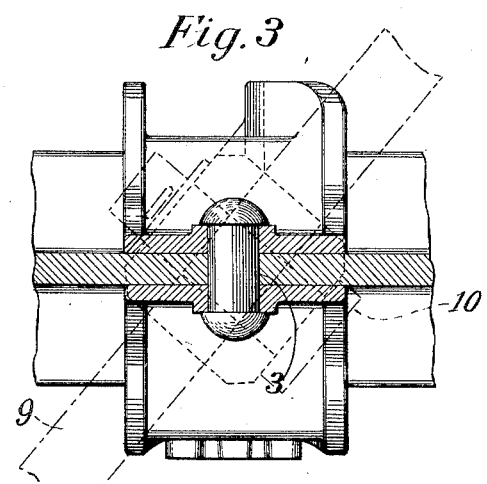
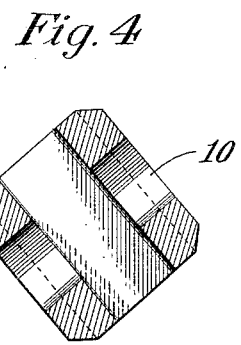
Witnesses:
Inventor
Jacob J. Byers
By his Attorney

UNITED STATES PATENT OFFICE.

JACOB J. BYERS, OF CHICAGO, ILLINOIS, ASSIGNOR TO THE NATIONAL MALLEABLE CASTINGS COMPANY, OF CLEVELAND, OHIO.

BRAKE-BEAM FULCRUM.

1,098,425.     Specification of Letters Patent.     Patented June 2, 1914.

Application filed September 23, 1913. Serial No. 791,291.

*To all whom it may concern:*

Be it known that I, JACOB J. BYERS, a citizen of the United States, residing at Chicago, Cook county, Illinois, have invented an Improved Brake-Beam Fulcrum, of which the following is a specification, reference being had to the accompanying drawing, in which—

Figure 1 is an elevation of my improved device and of the brake beam to which it is attached; Fig. 2 is an elevation showing the brake beam in section; Fig. 3 is a section on lines III—III of Fig. 1; and Fig. 4 is a section on lines IV—IV of Fig. 2.

My invention relates to brake beams and consists in providing a fulcrum therefor, which is adapted to be adjusted to take care of variations in size of the brake beams and variations in the location of the rivet holes in the brake beams. My improved fulcrum also permits being fitted to a brake beam in use without removal of the brake heads.

Referring to the drawings 2 indicates a brake beam of the usual I-beam construction which has a rivet hole 3 therethrough. The fulcrum is comprised of two parts 4 and 5, which are attached to the brake beam 2 by a rivet 6 which passes through the rivet hole 3 of the brake beam 2 and the elongated holes 7 in the parts 4 and 5. The part 4 of the fulcrum takes about the brake beam 2 and has a slot 8 for reception of the usual lever 9 which is secured to the part 4 by the pivot 10 which has a bearing in the apertures 11 of the part 4. The part 4 engages the part 5 by a projection 12 which is adapted to enter the orifice 13 in the part 5.

When the fulcrum is applied to the brake beam the elongated holes 7 permit of variations in the location of the rivet hole 3, while the engagement of the projection 12 on the part 4 with the orifice 13 of the part 5 allows for variations in size of the brake beams, thereby enabling the application of my improved fulcrum to various sizes of brake beams without change in the size of the fulcrum.

It is obvious that various changes may be made in the construction and application of my improved fulcrum without departing from my invention.

What I claim is:

1. A brake beam fulcrum comprised of two parts having a projection and socket engagement and being adapted to take about brake beams of various sizes.

2. A brake beam fulcrum adapted to be riveted to the brake beam, the said fulcrum consisting of two parts taking about said brake beam and having a projection and socket engagement, the said projection and socket engagement permitting the adjustment of the fulcrum to fit varying sizes of brake beams.

3. A brake beam fulcrum comprised of two parts adapted to engage opposite faces of a brake beam, the said parts having a socket and projection engagement with each other and being adapted to telescope to permit of variations in the size of the brake beam.

4. A brake beam fulcrum comprised of two parts having a projection and socket engagement and being adapted to engage brake beams of varying sizes, the projection and socket engagement permitting the parts to telescope in the direction of the said engagement.

5. A brake beam fulcrum comprised of two parts the said two parts having elongated rivet holes for attachment to the brake beam and a socket and projection engagement with each other, the said elongated rivet holes permitting variations in the location of the rivet holes and the socket and projection engagement permitting attachment to varying sizes of brake beams.

JACOB J. BYERS.

Witnesses:
ALBERT O. BUCKINS, Jr.,
JUDSON D. HIATT.

---

Copies of this patent may be obtained for five cents each, by addressing the "Commissioner of Patents, Washington, D. C."